United States Patent [19]

Haydon

[11] 4,004,168

[45] Jan. 18, 1977

[54] ELECTRIC ROTATING MACHINE

[75] Inventor: Arthur W. Haydon, Middlebury, Conn.

[73] Assignee: Tri-tech, Inc., Waterbury, Conn.

[22] Filed: Aug. 8, 1974

[21] Appl. No.: 495,928

[52] U.S. Cl. .............................. 310/41; 310/164; 310/156; 310/257

[51] Int. Cl.² ...................................... H02K 7/118

[58] Field of Search ...... 310/41, 71, 156, 162–165, 310/269, 257, 49, 43, 190–193

[56] References Cited

UNITED STATES PATENTS

| | | | |
|---|---|---|---|
| 3,370,189 | 2/1968 | Haydon et al. | 310/156 X |
| 3,475,630 | 10/1969 | Heinzen et al. | 310/43 |
| 3,495,107 | 2/1970 | Haydon | 310/49 |
| 3,863,084 | 1/1975 | Hasebe | 310/41 X |

FOREIGN PATENTS OR APPLICATIONS

678,526   9/1952   United Kingdom ................. 310/41

Primary Examiner—Donovan F. Duggan
Attorney, Agent, or Firm—Lee C. Robinson, Jr.

[57] ABSTRACT

A self-starting unidirectional electric motor in which a pair of auxiliary stator pole members are angularly spaced from the main stator poles and are provided with a magnetic return path having a reluctance which is less than the reluctance of the return path for the main stator poles. When the field coil of the motor is deenergized, the rotor consistently assumes a favorable starting position in which each rotor pole is opposite one of the auxiliary pole members. In several advantageous embodiments the housing for the motor is fabricated from nonconductive, nonmagnetic material, and the main stator poles serve as the motor's electrical terminals.

12 Claims, 11 Drawing Figures

ELECTRIC ROTATING MACHINE

BACKGROUND OF THE INVENTION

This invention relates to electric rotating machines and more particularly to self-starting synchronous and stepper motors.

There has been developed a class of electric motors which are compact in size and extremely efficient. Representative motors of this type are disclosed in Arthur W. Haydon U.S. Pat. Nos. 3,495,113 granted Feb. 10, 1970, 3,495,111 also granted Feb. 1, 1970 and 3,564,214 granted Feb. 16, 1971; Arthur W. Haydon and John J. Dean patent 3,770,998 granted Nov. 6, 1973; and Arthur W. Haydon copending application Ser. No. 438,761 filed Feb. 1, 1974, now U.S. Pat. No. 3,909,646 granted Sept. 30, 1975. To achieve unidirectional self-starting characteristics, motors of this type commonly include shading devices for selected ones of the stator poles and a nonuniform air gap between the stator poles and the rotor, such that upon energization of the field coil of the motor, the rotor uniformly and consistently begins its rotation in a given direction.

Electric motors including those of the foregoing type in a number of instances need to operate reliably for extended periods of time in a sealed or inaccessible location. Particularly under such conditions, the motors advantageously should be of simple construction with a minimum number of parts, because additional parts often create potential sources of failure. In many cases, as in air-borne or space vehicles, the weight of the motor also is a consideration.

Additionally, the motors often are employed with auxiliary apparatus under conditions in which the motor is designed to be discarded and replaced, after a period of time, rather than repaired. The design of the motor accordingly should be such that it may be readily plugged in and removed from a mating receptacle on the apparatus, and since each additional part usually represents an added item of cost, it is desirable to minimize the number of parts.

To further improve the overall compactness and efficiency of the motors and at the same time lower their cost to the consumer, it would also be desirable to simplify the design of the field coil and cooperating structure. However, attempts to eliminate such parts as shading rings, for example, often resulted in a motor that heretofore was not consistently and reliably self-starting in a given direction. In addition, the fine wire size and large number of turns in the coils of prior motors designed for operation at, say, 115 volts at 1 watt, resulted in a coil which was too expensive for certain applications.

Difficulties also were encountered in the assembly of such previous motors, and particularly in the successive steps necessary to secure the electrical leads to the coil and to provide for suitable connectors externally of the housing of the motor in order to attach the leads to a source of power.

SUMMARY

One general object of this invention, therefore, is to provide a new and improved electric motor or other electric rotating machine.

More specifically, it is an object of the invention to provide an electric motor which is consistently and reliably self-starting without the use of shading coils and similar devices.

Another object of this invention is to provide a machine of the character indicated which uniformly and consistently starts in a given direction.

A further object of the invention is to provide an electric motor in which the field coil of the motor may employ larger diameter wire with fewer number of turns than prior motors having the same input parameters.

Still another object of the invention is to provide an electric rotating machine which is readily adaptable for connection to an external current source.

A still further object of the invention is to provide an electric motor utilizing comparatively simple mechanical and electrical components which is economical to manufacture and thoroughly reliable in operation.

In one illustrative embodiment of this invention, the motor or other electric rotating machine includes a permanent magnet cylindrical rotor having a pair of nonsalient rotor poles of opposite magnetic polarity. A single pair of salient stator poles is located in magnetic flux relationship with the rotor, and a field coil is arranged to energize the stator poles with magnetic flux, such that at a given moment the stator poles are of opposite magnetic polarity. A cover or housing of nonmagnetic material is disposed about the field coil. Upon energization of the field coil, the stator pole flux follows a flow path from a stator pole of one polarity, then to the rotor, then to the stator pole of opposite polarity, and then back along a nonmagnetic return path to the first stator pole. The magnetic interaction between the stator and rotor poles initiates rotation of the rotor.

In accordance with one feature of several preferred embodiments of the invention, the return path for the salient stator pole flux exhibits a high magnetic reluctance. This may be achieved, for example, by providing an air gap in the return path or by utilizing a nonmagnetic housing. Among its other advantages, the increased reluctance of the return path enables the realization of substantially improved starting characteristics for the machine.

In accordance with another feature of the invention, in certain particularly important embodiments, the machine includes unique detent means having a pair of auxiliary pole members in magnetic flux relationship with the rotor. The auxiliary pole members are provided with a magnetic return path having a reluctance lower than the reluctance of the return path for the main stator poles, with the result that, when the field coil is deenergized each pole of the rotor comes to rest opposite one of the auxiliary pole members and is angularly spaced from the main poles. When the coil is again energized, the rotor poles are attracted or repelled by the main stator poles such that the rotor is consistently and reliably self-starting.

In accordance with a further feature of several advantageous embodiments of the invention, the auxiliary pole members are angularly spaced from the main stator poles at an angle which lies within the range of from about 30 electrical degrees to about 60 electrical degrees. With this arrangement, within the first complete cycle of an applied alternating current wave form the rotor achieves synchronous speed.

In accordance with still another feature of the invention, in some embodiments, the salient stator poles are provided with integral extensions which form the electrical terminals of the machine. These extensions protrude through the housing and serve as plug-in connec-

DESCRIPTION OF CERTAIN PREFERRED EMBODIMENTS

Figure 1:
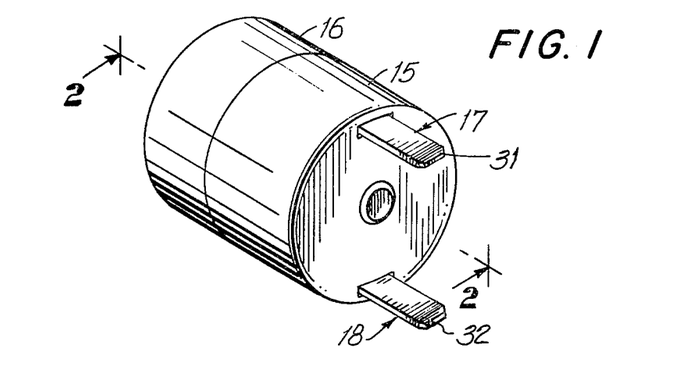
FIG. 1 is a perspective view of an electric motor in accordance with one illustrative embodiment of the invention.
Figures 2, 3:
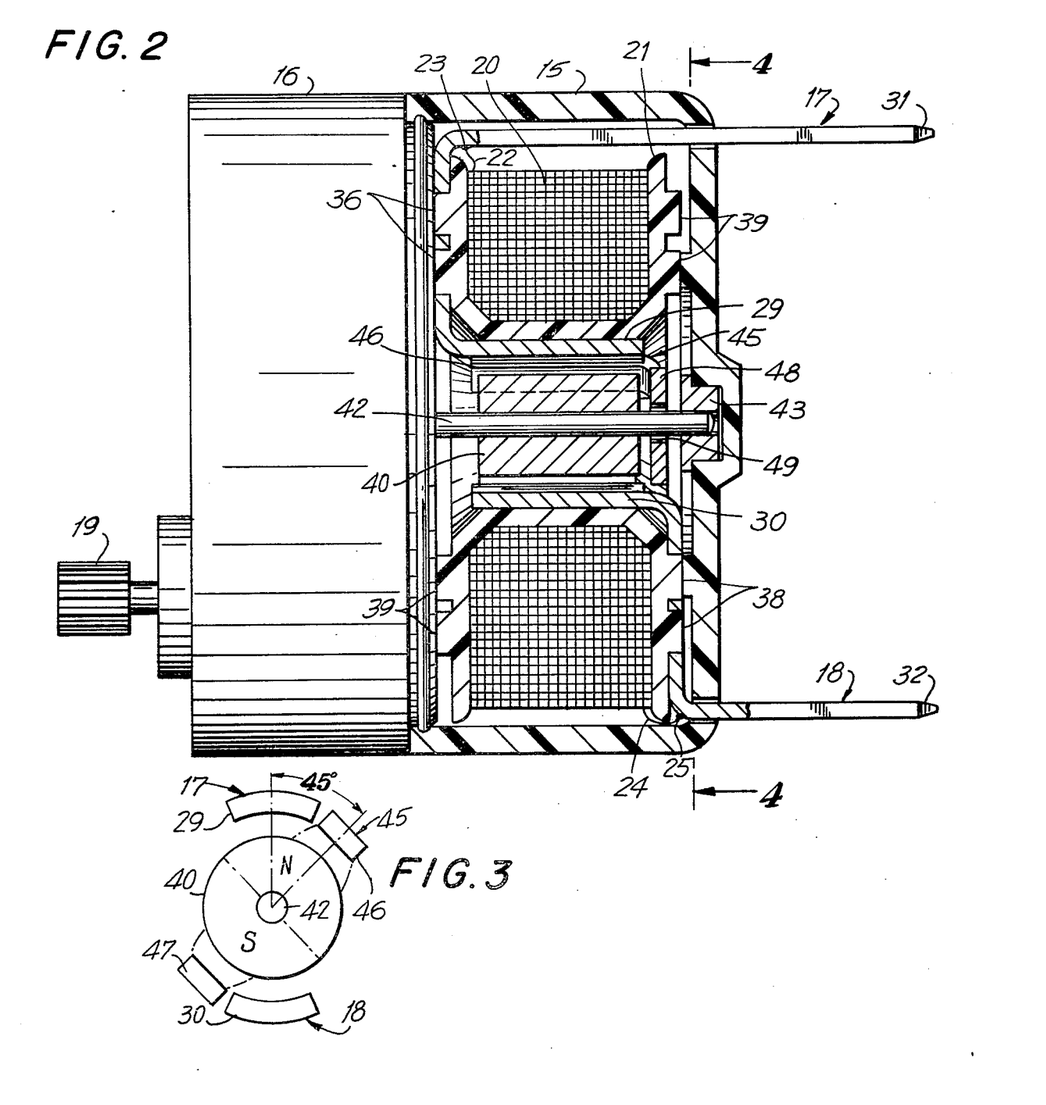
FIG. 2 is an enlarged vertical sectional view of the motor taken along the line 2—2 in FIG. 1.
FIG. 3 is a schematic drawing showing the magnetic relationship between the rotor and the stator structure of the motor.

Referring to FIGS. 1 and 2 of the drawings, there is shown an electric rotor which includes a cup-shaped cover or housing 15 and a cylindrical gear box 16 in coaxial relationship with the housing. The housing 15 and the gear box 16 are each fabricated from plastic or other nonmagnetic, nonconductive material and are arranged in snap-fitting relationship with each other to form a compact cylindrical structure. The gear box 16 contains a suitable gear train (not visible in the drawings) to provide an appropriate speed reduction at an output pinion 19 consistent with the purposes for which the motor is designed.

Two stator pole pieces 17 and 18 protrude through diametrically opposed slots in the housing 15. The pole pieces 17 and 18 cooperate with an energizing winding 20 which is located within the housing 15 around a molded plastic bobbin 21. The winding 20 is provided with two end leads 22 and 24 which are electrically connected to the pole pieces 17 and 18 by solder connections 23 and 25, respectively, to maintain the pole pieces in electrically conductive relationship with the winding. The winding and its supporting bobbin are coaxial with the housing 15 and the gear box 16 and are held in position between the inner circular surfaces of the housing and gear box.

The inner portion of the stator pole piece 17 is of generally U-shaped configuration and extends along the inner cylindrical wall of the housing 15, then between the bobbin 21 and the adjacent surface of the gear box 16, and then along the inner cylindrical wall of the bobbin to form a salient stator pole 29. The inner portion of the stator pole piece 18 is generally L-shaped with its intermediate portion positioned between the inner surface of the housing 15 and the bobbin 21 and its innermost portion extending along the bobbin's inner cylindrical wall to form a salient stator pole 30. The stator poles 29 and 30 are disposed parllel to the axis of the housing 15 in diametrically opposed relationship with each other, and as best seen in FIG. 3 the poles are of arcuate cross-section.

Figure 4:
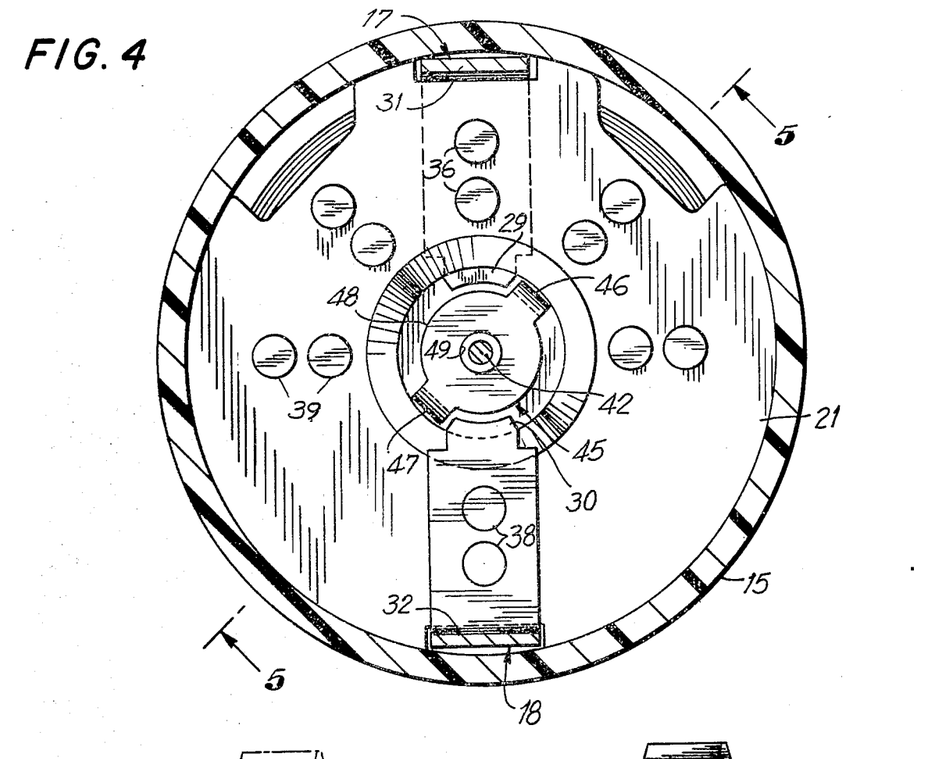
FIG. 4 is a sectional view taken along the line 4—4 in FIG. 2.

A pair of bosses 36 are integrally molded on the surface of the bobbin 21 which faces the gear box 16. These bosses extend through mating apertures in the intermediate portion of the stator pole piece 17 to hold the pole piece in place. Similarly, two bosses 38 on the opposite surface of the bobbin 21 extend through corresponding apertures in the intermediate portion of the stator pole piece 18 to maintain the pole piece in its proper position. If desired, further bosses 39 (FIG. 4) may be molded on the opposed surfaces of the bobbin such that the various pole pieces of the motor may be mounted in different positions consistent with the type of motor and the desired operating parameters.

The illustrated form of the motor includes only a single pair of salient stator pole 29 and 30 in magnetic flux relationship with a rotor 40. The rotor 40 comprises a comparatively long, thin cylinder of ceramic magnetic material which is magnetized permanently with but a single pair of opposite north and south poles, as indicated by the letters N and S in the drawings. The rotor material is relatively "hard" to provide high coercivity, low permeability, a high magnetic energy product and a low specific gravity. Representative examples of such materials are Ceramagnet A, A19 and A70 manufactured by Stackpole Carbon Company, Electronic Components Division Saint Marys, Pennsylvania, and Indox I and Indox V manufactured by Indiana General Corporation, Valparaiso, Indiana. Such materials are of barium ferrite having a composition Ba-$Fe_{12}O_{19}$. Another suitable material is Plastiform available from the Leyman Division of Minnesota Mining & Manufacturing Company, Cincinnati, Ohio. The rotor also may be produced from a 77% platinum, 23% cobalt material made by the Hamilton Watch Company of Lancaster, Pennsylvania. This latter material has a residual induction of 6,400 gauss, a coercive force of 4,300 oersteds and a maximum energy product of $9.0 \times 10^6$ gauss-oersteds. Another particularly advantageous rotor material having an even higher energy product is samarium cobalt, also commercially available at the present time.

The rotor 40 includes an axial hole into which a shaft 42 is secured as by cementing, molding or other suitable techniques. The shaft 42 is rotatably supported between the gear box 16 and a bearing 43 which is centrally located within the adjacent end of the non-magnetic housing 15. In some embodiments, particularly where Plastiform is used as the rotor material, a series of comparatively thin washers of the material are placed in stacked relationship with each other on the shaft 42 and are adhesively held together to form the rotor. In other advantageous arrangements the Plastiform material, may be rolled in sheet form, slit and ground, or it may be extruded in tubular form, cut to length and pressed on the shaft.

The use of a long rotor increases the torque available to operate the motor. A comparatively high torque is produced when the ratio of rotor length to diameter exceeds about 1.25:1. The net usable torque falls off rapidly when this ratio approaches 1:1. In addition, by maintaining the ratio at least about 1.25:1 the low inertia of the rotor enables substantially instantaneous starting and stopping. This latter feature is particularly advantageous in cases in which the motor is used for intermittent timing operations or for other applications where it is desired to avoid the introduction of a cumulative error in the position of the rotor shaft after repeated starts and stops.

Figure 5:
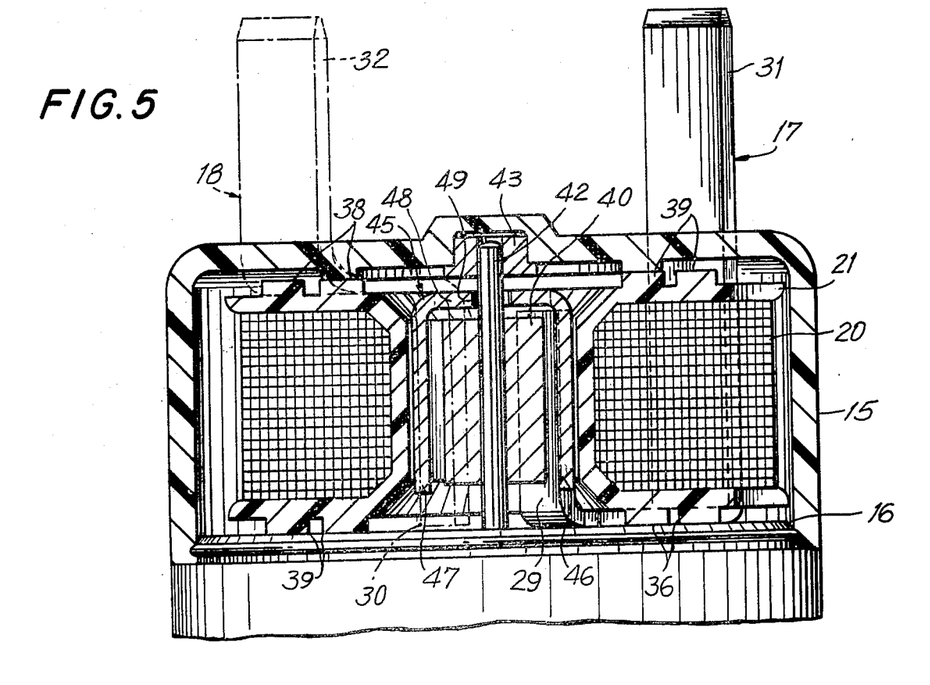
FIG. 5 is a sectional view taken along the line 5—5 in FIG. 2.

As best shown in FIG. 5, a detent device 45 is suitably affixed adjacent the inner circular surface of the nonmagnetic housing 16. The device 45 comprises a pair of diametrically opposed auxiliary pole members 46 and 47 and an integrally formed return path member 48 to provide a U-shaped structure. A circular opening 49 in the member 48 is coaxial with the housing and accommodates the rotor shaft 42. The device 45 forms a part of the stator structure of the motor and is manufactured from cold rolled steel or other magnetic material. The auxiliary pole members 46 and 47 are circumferentially spaced from the main stator poles 29 and 30 by a clockwise angle, as viewed in FIG. 3, which is approximately 45 degrees, for purposes that will become more fully apparent hereinafter.

The salient stator poles 29 and 30 are provided with a nonmagnetic return path defined by the housing 15, the gear box 16 and the surrounding atmosphere. Conventional practice is to produce these components from steel or other magnetic material in order to maintain the reluctance of the path for the stator pole flux at a minimum and thus operate the motor at optimum efficiency. But with a nonmagnetic housing and gear box as taught by the present invention the motor also exhibits good efficiency as well as substantially better starting and running characteristics than prior unshaded pole motors with magnetic return paths for the stator pole flux.

In the embodiment of FIGS. 1–5 these results are achieved through the use of the auxiliary pole members 46 and 47. In the quiescent position of the rotor 40, shown schematically in FIG. 3, the lines of flux between the north and south poles of the rotor and the pole members 46 and 47 are illustrated by broken lines. The flux flows from the north pole of the rotor, across the air gap to the adjacent pole member 46, then along the pole member and the magnetic return path member 48 (FIG. 5) to the pole member 47 then along the pole member 47, and back across the air gap to the south pole of the rotor. The rotor is magnetically held with its poles in line with auxiliary pole members 46 and 47 and angularly spaced from the main stator poles 29 and 30 by an angle which approximates 45 mechanical degrees. In cases in which the rotor has a plurality of pairs of magnetized regions or poles, and from the viewpoint that the circumferential distance between one north pole to the next north pole corresponds to 360 electrical degrees, the angular spacing of the auxiliary pole members with respect to the stator poles may be described as 45 electrical degrees.

When alternating current is applied to the pole piece terminals 31 and 32, the winding 20 is energized to alternately magnetize the main stator poles 29 and 30 north and south at a frequency corresponding to the applied AC waveform. At any given moment the stator poles 29 and 30 are of opposite magnetic polarity. Referring to FIG. 3, if the initial magnetization of the stator pole 29 is north, for example, the pole 29 repels the north pole of the rotor 40, and the rotor begins its rotation in a clockwise direction. Because of the extremely low inertia of the rotor, at the end of the first cycle of the applied waveform, that is, by the time the polarity of the pole 29 has changed to south and again becomes north, the rotor has moved through a complete revolution and is running at synchronous speed.

If, on the other hand, the stator pole 29 initially is of south polarity at the time the winding 20 is energized, the rotor 40 moves backwards through a 45 degree angle, stops momentarily when it comes into alignment with the poles 29 and 30, and then, as the magnetization of the stator poles approaches zero at the end of the first one-half cycle, returns to its position in line with the auxiliary poles 46 and 47. In the next one-half cycle the stator pole 29 is of north polarity, and the pole repels the adjacent rotor pole to drive the rotor clockwise. Upon the completion of the first full cycle of the applied waveform, the rotor approaches the end of its first clockwise revolution and is running at synchronous speed.

The motor of FIGS. 1–5 is particularly well suited for use as a stepper motor. For a two-wire stepper motor, for example, the winding 20 may be driven by a complementary electronic circuit of conventional design which provides alternate positive and negative current pulses of short duration, either at a constant frequency or on a random pulse basis, to the winding. Alternatively, a center-tapped winding may be pulsed to operate the motor as a three-wire stepper motor. The construction of the main and auxiliary stator poles, their magnetic properties (reluctance), and their interrelationship with the magnetic rotor poles aid in causing the rotor to assume its novel quiescent position described herein upon the termination of each pulse, and to start reliably and substantially instantaneously in the prescribed direction when the stator poles are again magnetized in response to the succeeding pulse.

During the energization of the salient stator poles 29 and 30, the stator pole flux follows a flow path from a stator pole of one polarity, then across the rotor to the stator pole of opposite polarity, and then back along a partially nonmagnetic return path to the first pole. This return path may be traced from along the radial portion of the opposite polarity pole to the periphery of the winding 20, then across the air gap between the opposite pole and the cylindrical wall of the nonmagnetic housing 15, and then along the further gap defined by the cylindrical wall and the surrounding atmosphere to the first pole. The distance travelled by the flux flowing along the nonmagnetic portion of the return path may be varied by changing the appropriate dimensions of the motor to provide a reluctance which is carefully coordinated with the motor's overall magnetic characteristics. For optimum starting and running characteristics this reluctance advantageously is greater than the reluctance of the magnetic return path between the auxiliary pole members 46 and 47.

When the winding 20 is deenergized, the rotor 40 consistently assumes a position, illustrated in FIG. 3, in which each rotor pole is opposite one of the auxiliary pole members 46 and 47 and is angularly spaced from the stator poles 29 and 30. The rotor stops in a position where its own magnetic poles find the lowest reluctance path. Because the reluctance is less between the auxiliary pole members 46 and 47 than the reluctance between the stator poles 29 and 30, the rotor consistently assumes the most favorable position for starting when the winding 20 is again energized.

With the auxiliary pole members 46 and 47 angularly spaced from the salient stator poles 29 and 30 in a clockwise direction, the direction of rotation of the rotor 40 likewise is clockwise. Conversely, when the pole members are angularly spaced in a counterclockwise direction with respect to the stator poles, the direction of rotation of the rotor is counterclockwise.

The 45 degree angular spacing of the auxiliary pole members 46 and 47 with respect to the stator poles 29 and 30 is not critical. However, to achieve optimum unidirectional self-starting characteristics the auxiliary pole members should be angularly spaced from their adjacent stator poles by an angle which lies within the range of from about 30 electrical degrees to about 60 electrical degrees. Outside this range, the rotor will not consistently start in the prescribed direction in response to energization of the field coil.

To achieve an even further improvement in the operating characteristics of the motor, the detent device 45 is designed such that in the deenergized condition the magnetic flux from the rotor 40 brings the device at least close to the saturation point. This may be accomplished, for example, by maintaining the cross-section of the auxiliary pole members 46 and 47 comparatively small or by fabricating the pole members from a saturable material such as MuMetal. When the field coil 20 is energized, the pole members 46 and 47 become saturated and no longer produce any detent action. Under these conditions none of the flux from the main stator poles 29 and 30 is needed to overcome the magnetic detent effect, and yet the detent action is still quite effective below the saturation point.

Even in cases in which the auxiliary pole members 46 and 47 do not become saturated, when the field coil 20 is energized the detent action of the pole members is effectively nullified. The strength of the magnetic field from the coil 20 is of course much greater than that from the permanently magnetized rotor poles, and energization of the coil serves to magnetize the members 46 and 47 to the same polarity. The rotor is repelled by one of the members, and this serves to cancel out the attraction of the other member, such that the movement of the rotor is controlled substantially solely by the flux from the main stator poles 24 and 30.

In certain advantageous forms of stepper motors in accordance with the invention, the overall structure is basically similar to the structure shown in FIGS. 1–5 except that the auxiliary pole members 46 and 47 of the detent device 45 are permanently magnetized to provide respective north and south poles. One convenient way of accomplishing this is to attach strips of permanently magnetized Plastiform to the inner surfaces of the members 46 and 47. The rotor 40 has only a single quiescent position in which the north pole of the rotor is opposite the south auxiliary pole member and the south pole of the rotor is opposite the north auxiliary pole member.

With this arrangement the motor readily functions as a two-wire stepper motor. In accordance with conventional practice a suitable diode is connected in series with the energizing winding 20, or an electronic circuit is employed to provide a train of unidirectional direct current pulses from an alternating current source. Upon the application of each pulse, the rotor 40 substantially instantaneously starts in the prescribed direction and moves through an angle of 180 electrical degrees (180 mechanical degrees for a two pole rotor). Upon termination of the applied pulse, the detent action of the permanently magnetized pole members 46 and 47 drives the rotor through the remaining 180 degrees to the quiescent position.

The rotor 40 thus rotates a full 360° in response to each pulse. The strength of the pulse is such that the magnetic detent action is overcome to permit the rotor to turn until its poles are in line with the stator poles 29 and 30. When the pulse terminates the rotor continues to turn, passes the opposing magnetic field of the pole members 46 and 47 because of its momentum, and moves around until it reaches its initial starting position, where it is held in an attracting polarity relationship by the members 46 and 47.

Figure 6:
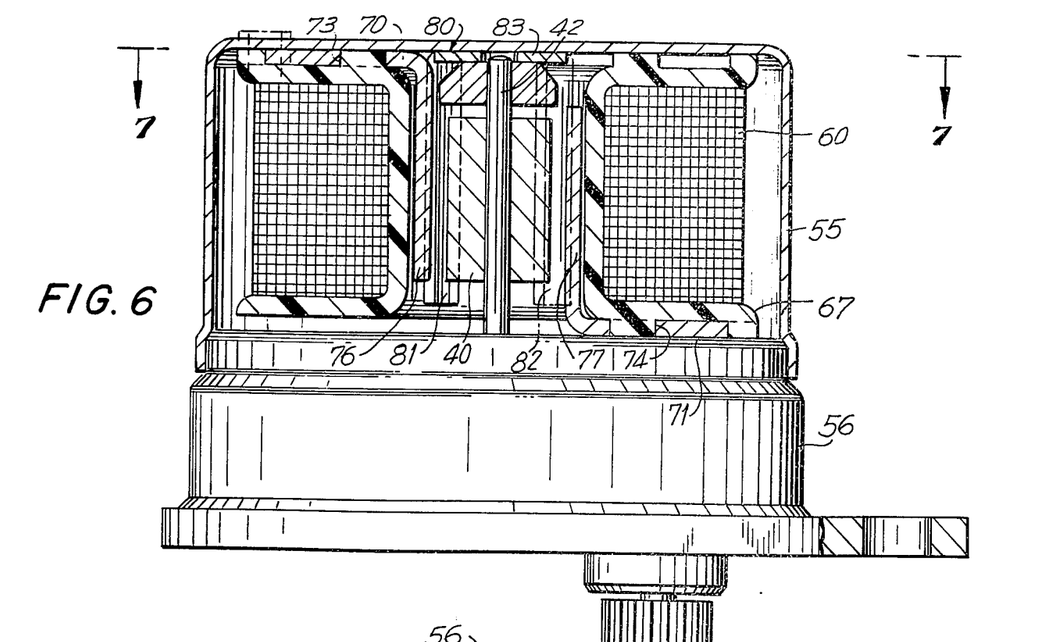
FIG. 6 is a sectional view similar to FIG. 2 but showing a 3-wire stepper motor in accordance with another illustrative embodiment of the invention.
Figure 7:
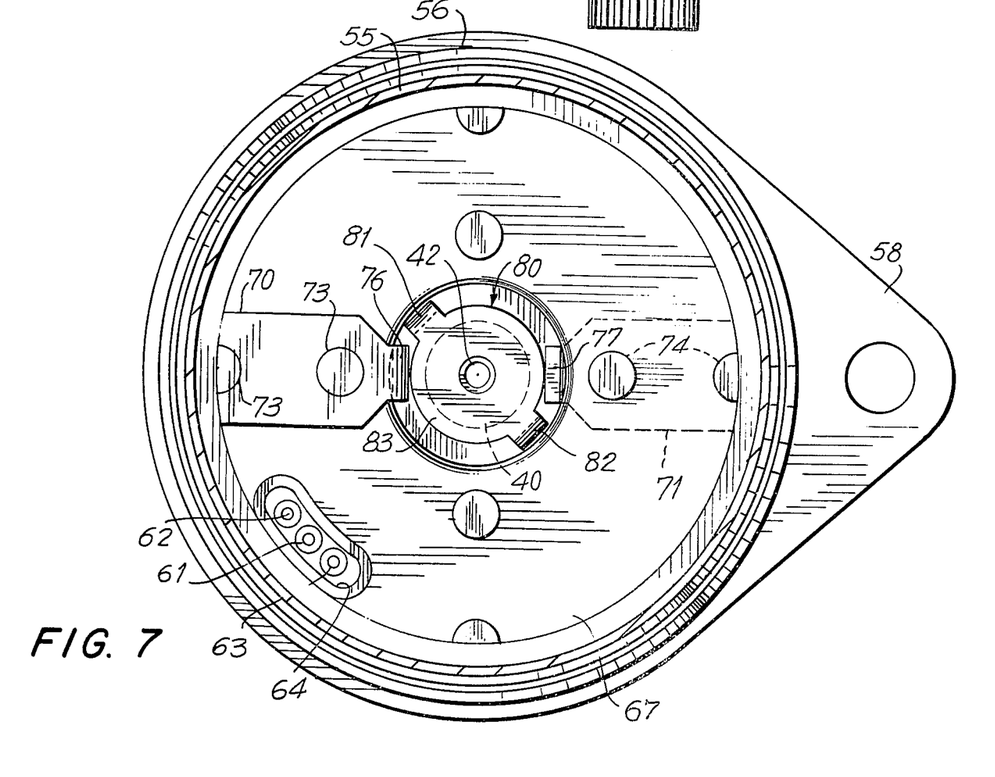
FIG. 7 is a sectional view taken along the line 7—7 in FIG. 6.

FIGS. 6 and 7 are illustrative of a three-wire stepper motor in accordance with another preferred embodiment of the invention. The motor includes a cup-shaped cover or housing 55 which is fabricated from steel or other magnetic material. The gear box 56 is fabricated of plastic or aluminum and is provided with a pear-shaped flange 58 to facilitate the mounting of the motor on suitable ancillary apparatus.

Supported within the housing 55 is an energizing winding 60. The winding 60 includes a center tap lead 61 and two outer leads 62 and 63 which protrude through a suitable slot 64 in the housing 55. The winding 60 is carried by a plastic bobbin 67 which is maintained in position between the inner circular wall of the housing 55 and the facing wall of the gear box 56.

Two stator pole pieces 70 and 71 of L-shaped configuration are mounted within the housing 55. The pole piece 70 is held in place by suitable bosses 73 which protrude from the bobbin 67 between the bobbin and the inner circular wall of the housing. Similarly, the pole piece 71 is maintained in position by bosses 74 between the bobbin 67 and the inner wall of the gear box 56.

The pole pieces 70 and 71 respectively form salient stator poles 76 and 77. The stator poles 76 and 77 are located in magnetic flux relationship with the rotor 40 and each extend in a direction parallel to the rotor's axis of rotation. The poles 76 and 77 are oriented 180 degrees apart in a manner similar to the poles 29 and 30 illustrated in FIG. 3 and are magnetically coupled with the opposite sides of the energizing winding 60.

Supported in fixed relationship with the inner circular wall of the housing 55 is a detent device 80. The device 80 is generally U-shaped and includes two auxiliary pole members 81 and 82 which are oppositely disposed with respect to the rotor 40 and are integrally connected by a magnetic return path member 83. The pole members 81 and 82 are oriented at an acute angle, illustratively 45 electrical degrees, with respect to the main stator poles 76 and 77 in a manner similar to that described above.

The center-tapped energizing winding 60 is supplied with direct current pulses of alternate polarity to operate the motor as a three-wire stepper motor in a manner similar to that described in Arthur W. Haydon U.S. Pat. No. 3,495,113, for example. Upon the energization of the winding 60 with each current pulse, at a given moment the salient stator poles 76 and 77 are of opposite magnetic polarity. Upon the termination of each pulse, the rotor 40 consistently assumes a position in which each rotor pole is opposite one of the auxiliary pole members 81 and 82 and is angularly spaced from the main stator poles 76 and 77 to locate the rotor in its most favorable position for starting when the winding is again energized. Because of the magnetic material for the detent device 80 and the air gap between the radial portion of the pole 77 and the housing 55, the reluctance of the return path for the flux from the pole members 81 and 82 is less than the reluctance of the return path for the main stator pole flux from the poles 76 and 77. The rotor starts substantially instantaneously and uniformly rotates in the prescribed direction through a single complete revolution in response to each successive pulse cycle.

In a modified version of the motor there are provided only a single salient stator pole and only a single auxiliary or detent pole. In the quiescent position of the rotor 40, the rotor poles are oriented in line with the auxiliary pole by the rotor's magnetic flux, thus maintaining the motor in its most favorable position for starting. When the field coil is energized with a current pulse of given polarity, the flux from the single stator pole overrides the rotor flux and causes the rotor to rotate in the desired direction.

Figure 8:
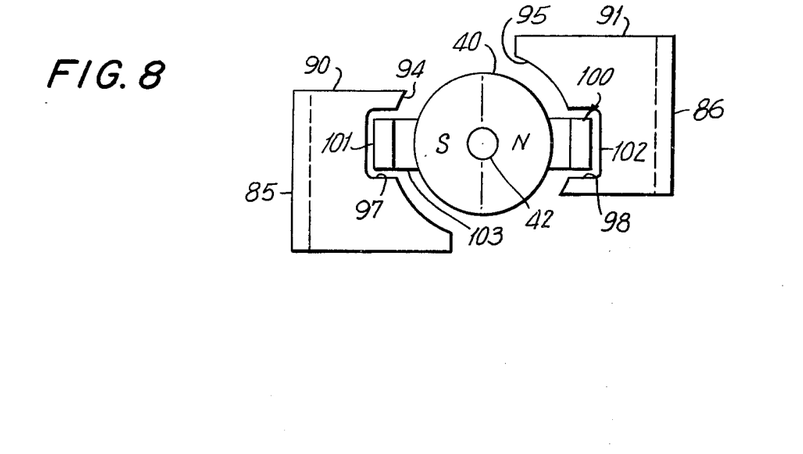
FIG. 8 is a schematic representation of the rotor and stator structure for a motor in accordance with a further illustrative embodiment of the invention.

Referring now to the schematic illustration of FIG. 8, there is shown an alternating current synchronous motor of the open-frame type. The stator structure of the motor is similar in some respects to that described and illustrated in more detail in Haydon et al. U.S. Pat. No. 3,469,132, and for present purposes it will be noted that the stator includes a pair of laminated pole pieces 85 and 86 which terminate in respective salient stator poles 90 and 91 in spaced relationship with the rotor 40. The stator poles 90 and 91 are alternately magnetized north and south by the flux from a suitable energizing winding (not shown in FIG. 8).

The salient stator poles 90 and 91 include arcuate pole surfaces 94 and 95, respectively. The curvature of these surfaces corresponds to that of the rotor 40, and each surface is spaced from the rotor to define an air gap therebetween. The surfaces 94 and 95 are provided with respective recesses or notches 97 and 98 which accommodate a U-shaped detent device 100 having auxiliary pole members 101 and 102 and an integral return path member 103. The device 100 is made of magnetic material and has a configuration similar to the detent devices 45 and 80 described heretofore.

The auxiliary pole members 101 and 102 are positioned in line with the rotational axis of the rotor 40. The main stator poles 90 and 91, on the other hand, are angularly disposed with respect to the members 101 and 102 such that a line through the rotor axis which intersects the centers of the arcuate surfaces 94 and 95 is angularly spaced from a line through the axis intersecting the centers of the members 100 and 101 by approximately 45 electrical degrees. This angle may be either clockwise or counterclockwise depending upon the desired direction of rotation of the rotor.

In the quiescent position of the rotor 40 of FIG. 8, the magnetic flux from the rotor poles maintains these poles in alignment with the auxiliary pole members 101 and 102. The rotor poles are thus angularly offset from the centers of the main stator poles 90 and 91, and the rotor is positioned in its most favorable position for starting. Upon energization of the field coil, the stator poles 90 and 91 are alternately magnetized north and south so that at a given moment the stator poles are of opposite magnetic polarity. The flux from the stator poles overcomes the flux in the members 101 and 102 and initiates rotation of the rotor in the prescribed direction in a manner similar to that described above.

Figure 9:
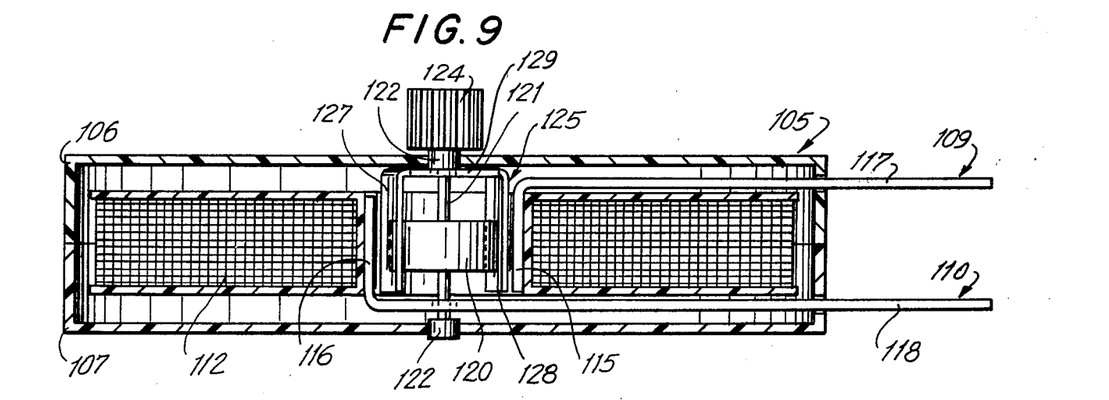
FIG. 9 is a vertical sectional view of a motor in accordance with a still further embodiment of the invention which is particularly adaptable for use in watches and similar timekeeping devices.

In several advantageous embodiments, synchronous and stepper motors in accordance with the invention may be miniaturized and employed to drive the hands of a watch, for example. As an illustration, FIG. 9 is a vertical sectional view of a stepper motor which is particularly adapted for use in a watch. The motor includes a housing 105 of plastic or other nonmagnetic material which is formed from a pair of cup-shaped members 106 and 107 to provide an enclosed structure. Two stator pole pieces 109 and 110 protrude from the housing 105 on opposite sides of an energizing winding 112 within the housing. The inner ends of the pole pieces 109 and 110 are of L-shaped configuration to form salient stator poles 115 and 116. The pole is integral with the pole piece 109 and cooperates with one side of the winding 112, and the stator pole 116 is integral with the pole piece 110 and cooperates with the opposite side of the winding.

The protruding portions of the pole pieces 109 and 110 form external extensions 117 and 118 which serve as the electrical terminals for the motor. In a manner similar to that described heretofore with respect to the motor of FIGS. 1–5, the pole piece 109 is soldered or otherwise electrically connected to one of the ends of the winding 112, and the pole piece 110 is electrically connected to the other end of the winding. The extensions 117 and 118 are comparatively rigid and may be readily inserted into a suitable AMP connector or other quick disconnect device to connect the winding to a source of power.

A permanent magnetic two pole rotor 120 is supported between the salient stator poles 115 and 116. The rotor 120 is mounted for rotation on a shaft 121 which is journalled in jeweled bearings 122 located in corresponding apertures in the housing 105. The shaft 121 extends through one of the bearings 122 and the adjacent portion of the cover and is provided with an external output pinion 124.

Rigidly affixed to the inner cylindrical wall of the cup-shaped member 106 is a detent device 125. The device 125 is of U-shaped configuration and includes two auxiliary pole members 127 and 128 and an integral return path member 129. The members 127, 128 and 129 are fabricated from magnetic material which advantageously comprises MuMetal or other saturable material. The pole members 127 and 128 are oppositely disposed with respect to the rotor 120 and are angularly spaced from the main stator poles 115 and 116 by a circumferential angle of about 45 electrical degrees.

As a result of the magnetic return path member 129 for the auxiliary poles 127 and 128 and the nonmagnetic return path member 105 for the salient stator poles 115 and 116, the reluctance of the return path for the auxiliary poles is less than that for the stator poles. Accordingly, in the quiescsent position the flux from the nonsalient rotor poles serves to align the rotor poles with the auxiliary poles, and the rotor is thus angularly spaced from the stator poles. When the field coil 112 is energized, the rotor automatically starts in the prescribed direction in the manner discussed above to drive the output pinion 124.

Figure 10:
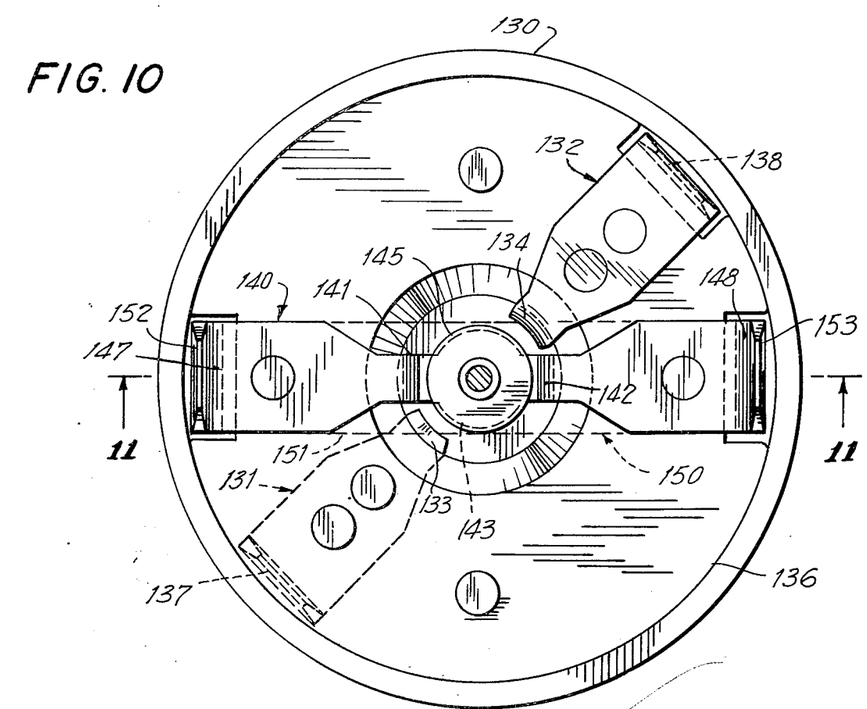
FIG. 10 is a sectional view similar to FIGS. 4 and 7 but illustrating an alternating current synchronous motor in accordance with still another illustrative embodiment of the invention.
Figure 11:
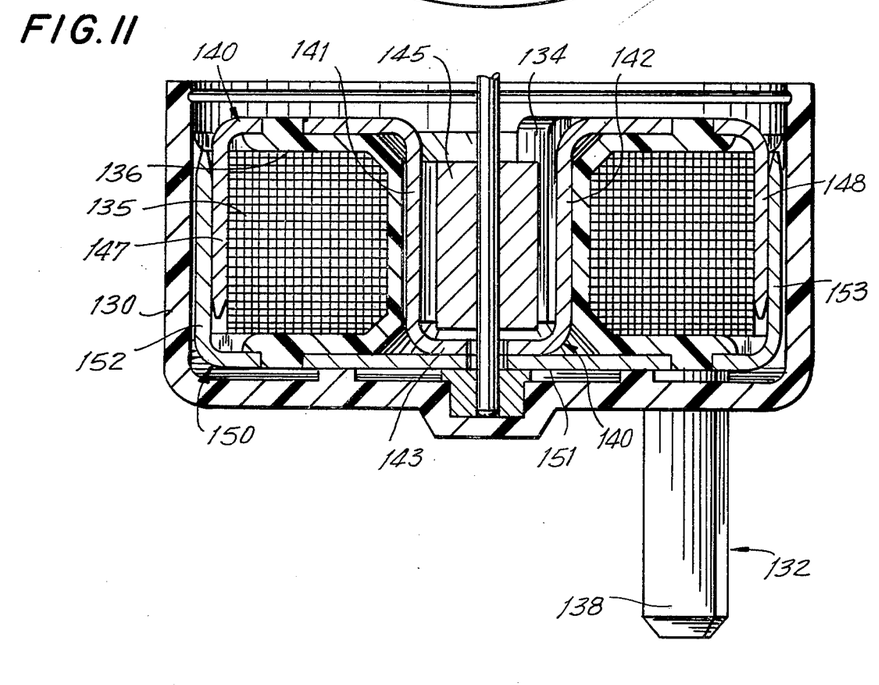
FIG. 11 is a sectional view taken along the line 11—11 in FIG. 10.

FIGS. 10 and 11 are illustrative of an electric rotating machine that is particularly well suited for use as an alternating current motor. The motor is provided with a cup-shaped cover or housing 130 of nonconductive, nonmagnetic material, a pair of stator pole pieces 131 and 132 which form salient stator poles 133 and 134, an energizing winding 135 and a supporting bobbin 136 which are generally similar to the embodiment illustrated in FIGS. 1–5. The pole pieces 131 and 132 are soldered to the opposite ends of the winding 135 and protrude through the housing 130 to form electrical terminals 137 and 138 for the motor.

The motor of FIGS. 10 and 11 additionally includes a detent device 140. The central portion of the device 140 is similar to the detent devices described heretofore and comprises two auxiliary pole members 141 and 142 and an integral return path member 143 of magnetic material. The pole members 141 and 142 are arrayed on opposite sides of a permanent magnet cylindrical rotor 145 and are angularly spaced from the main stator poles 133 and 134 by an angle of approximately 30 degrees.

As best shown in FIG. 11, the pole members 141 and 142 of the detent device 140 extend radially outward and then back along the outside of the winding 135 in the form of integral extensions 147 and 148, respectively. The magnetic circuits are closed by a U-shaped member 150 of steel or equivalent material interposed between the winding 135 and the nonmagnetic housing 130. The center or bight portion 151 of the member 150 is located between the detent device 140 and the housing 130, while the two legs 152 and 153 of the member are in respective facing contact with the extensions 147 and 148.

The detent device 140 and the U-shaped member 150 thus form two completely closed solid magnetic loops, one-hundred and eighty degrees apart, around the winding 135. When the winding is energized, the detent device becomes saturated and is effectively neutralized until the winding is deenergized and the device takes over and positions the rotor 145 in its most favorable position for starting. In addition, the extremely low reluctance of the magnetic loops provides a comparatively high inductance, with the result that for a given set of input parameters the winding may be wound from larger diameter wire with fewer turns than those employed in prior designs. For an AC synchronous motor designed to operate at 115 volts and 1 watt, for example, the fewer turns and larger diameter wire result in a winding that is substantially less expensive than equivalent motors having low inductance field coil circuits.

In the various illustrated embodiments the rotor is in the form of a comparatively long narrow cylinder and is permanently magnetized with only a single pair of nonsalient rotor poles. The rotor cooperates with a corresponding pair of salient stator poles and a unique detent device to provide particularly good operating characteristics and a high output torque.

The terms and expressions which have been employed are used as terms of description and not of limitation, and there is no intention, in the use of such terms and expressions, of excluding equivalents of the features shown and described, or portions thereof, it being recognize that various modifications are possible within the scope of the invention claimed.

What is claimed is:

1. An electric rotating machine comprising, in combination:

a permanent magnet rotor having a plurality of rotor poles of opposite magnetic polarity;

pole piece means including a pair of salient stator poles in magnetic flux relationship with the rotor, the stator poles being provided with integral extensions which form the electrical terminals of the machine;

winding means for energizing the salient stator poles with magnetic flux, so that a given moment the stator poles are of opposite magnetic polarity;

means defining a return path of given reluctance for the stator pole flux; and detend means including a pair of auxiliary pole members in magnetic flux relationship with the rotor and a magnetic return path having a reluctance lower than the given reluctance of the stator pole flux return path, each of the auxiliary pole members being angularly spaced in a given direction from an adjacent stator pole, the rotor being adapted consistently to assume a position, when the winding means is de-energized, in which each rotor pole is opposite one of the auxiliary pole members and is angularly spaced from the stator poles, said rotor consistently starting in said given direction when the winding means is energized.

2. An electric rotating machine comprising, in combination:

a permanent magnet rotor having a plurality of rotor poles of opposite magnetic polarity;

pole piece means including a pair of salient stator poles in magnetic flux relationship with the rotor, the stator poles having extensions thereon which form the electrical terminals of the machine;

winding means for energizing the salient stator poles with magnetic flux, so that at a given moment the stator poles are of opposite magnetic polarity;

means defining a return path of given reluctance for the stator pole flux, the stator pole flux following a flow path from a stator pole of one polarity, then across the rotor to the stator pole of opposite polarity, and then back along the return path to the first stator pole;

means for electrically connecting the winding means to the stator poles; and detent means including at least one auxiliary pole member in magnetic flux relationship with the rotor and a magnetic return path having a reluctance lower than the given reluctance of the stator pole flux return path, the auxiliary pole member angularly spaced from an adjacent stator pole, the rotor being adapted consistently to assume a position, when the winding means is deenergized, in which one of the rotor poles is opposite the auxiliary pole member and is angularly spaced from the stator poles.

3. An electric rotating machine comprising, in combination:

a permanent magnet rotor having a plurality of rotor poles of opposite magnetic polarity;

pole piece means including a pair of salient stator poles in magnetic flux relationship with the rotor, the stator poles having extensions thereon which form the electrical terminals of the machine;

winding means for energizing the salient stator poles with magnetic flux, so that at a given moment the stator poles are of opposite magnetic polarity;

a housing disposed about the winding means, the stator pole flux following a flow path from a stator pole of one polarity, then across the rotor to the stator pole of opposite polarity, and then back along the return path to the first stator pole, the extensions on the stator poles protruding through the housing and comprising plug-in connectors for the machine;

means for electrically connecting the winding means to the stator poles; and detent means including a pair of auxiliary pole members in magnetic flux relationship with the rotor each of the auxiliary pole members being angularly spaced from an adjacent stator pole, the rotor being adapted consistently assume a position, when the winding means is deenergized, in which each rotor pole is opposite one of the auxiliary pole members and is angularly spaced from the stator poles.

4. An electric rotating machine as defined in claim 3, in which the extensions on the stator poles are of rigid material.

5. An electric rotating machine comprising, in combination:

a permanent magnetic cylindrical rotor having a plurality of nonsalient rotor poles of opposite magnetic polarity and a length in excess of its diameter;

pole piece means including a single pair of salient stator poles in magnetic flux relationship with the rotor, the stator poles having integral extensions thereon which form the electrical terminals of the machine;

winding means for energizing the salient stator poles with magnetic flux, so that at a given moment the stator poles are of opposite magnetic polarity;

a housing of nonmagnetic material disposed about the winding means, the stator pole flux following a flow path from a stator pole of one polarity, then across the rotor of the stator pole of opposite polarity, and then back along the return path to the first stator pole, the extensions on the stator poles protruding through the housing and comprising plug-in connectors for the machine;

means for electrically connecting the winding means to the stator poles; and detent means including a pair of auxiliary pole members in magnetic flux relationship with the rotor, each of the auxiliary pole members being angularly spaced from an adjacent stator pole, the rotor being adapted consistently to assume a position, when the winding means is deenergized, in which each rotor pole is opposite one of the auxiliary pole members and is angularly spaced from the stator poles.

6. An electric rotating maching as defined in claim 5, in which the pole piece means comprises a pair of stator pole pieces of L-shaped configuration.

7. An electric rotating machine as defined in claim 5, in which the auxiliary pole members are permanently magnetized.

8. An electric rotating machine as defined in claim 5, in which each of the salient stator poles defines a recess therein, the auxiliary pole members being respectively disposed in the recesses.

9. An electric rotating machine comprising, in combination:

a permanent magnet rotor having a pair of rotor poles of opposite magnetic polarity;

pole piece means including a pair of salient stator poles in magnetic flux relationship with the rotor, the stator poles having extensions thereon which form the electrical terminals of the machine;

winding means for energizing the salient stator poles with magnetic flux, so that at a given moment the stator poles are of opposite magnetic polarity;

a housing disposed about the winding means, the stator pole flux following a flow path from a stator pole of one polarity, then across the rotor to the stator pole of opposite polarity, and then back along the return path to the first stator pole, the extensions on the stator poles protruding through the housing; and means for electrically connecting the winding means to the stator poles.

10. An electric rotating machine comprising, in combination:

a rotor having a pair of rotor poles of opposite magnetic polarity;

pole piece means including a pair of salient stator poles in magnetic flux relationship with the rotor, the stator poles having integral extensions thereon which form the electrical terminals of the machine;

winding means for energizing the salient stator poles with alternating magnetic flux, so that at a given moment the stator poles are of opposite magnetic polarity; and means for electrically connecting the winding means to the stator poles.

11. An electric rotating machine comprising, in combination:

a permanent magnetic rotor having a pair of rotor poles of opposite magnetic polarity;

pole piece means including a pair of salient stator poles in magnetic flux relationship with the rotor, the stator poles having extensions thereon which form the electrical terminals of the machine;

winding means for energizing the salient stator poles with magnetic flux, so that at a given moment the stator poles are of opposite magnetic polarity;

a housing of nonconductive material disposed about the winding means, the stator pole flux following a flow path from a stator pole of one polarity, then across the rotor to the stator pole of opposite polarity, and then back along the return path to the first stator pole, the extensions on the stator poles protruding through the housing; and means for electrically connecting the winding means to the stator poles.

12. An electric rotating machine comprising, in combination:

a permanent magnetic cylindrical rotor having a single pair of nonsalient rotor poles of opposite magnetic polarity and a length in excess of its diameter;

pole piece means including a single pair of salient stator poles in magnetic flux relationship with the rotor, the stator poles having integral extensions thereon which form the electrical terminals of the machine;

winding means for energizing the salient stator poles with alternating magnetic flux, so that at a given moment the stator poles are of opposite magnetic polarity;

a housing of nonconductive material disposed about the winding means, the extensions on the stator poles protruding through the housing; and means for electrically connecting the winding means to the stator poles.

* * * * *